US008405881B2

(12) United States Patent
Hayashi (10) Patent No.: US 8,405,881 B2
(45) Date of Patent: Mar. 26, 2013

(54) IMAGE PROCESSING DEVICE WITH AN ADDITIONAL IMAGE OVERLAYING FUNCTION

(75) Inventor: Akihiro Hayashi, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 961 days.

(21) Appl. No.: 12/419,720

(22) Filed: Apr. 7, 2009

(65) Prior Publication Data

US 2009/0257094 A1 Oct. 15, 2009

(30) Foreign Application Priority Data

Apr. 9, 2008 (JP) ................... 2008-101332

(51) Int. Cl.
*H04N 1/40* (2006.01)
*G06K 9/00* (2006.01)

(52) U.S. Cl. .......... 358/3.28; 358/1.9; 358/1.4; 358/3.1; 358/3.3; 358/1.15; 358/3.01; 358/3.02; 358/501; 358/529; 382/100; 382/135; 382/137; 382/162; 382/165; 382/175; 382/232; 380/203; 380/205

(58) Field of Classification Search ................ None
See application file for complete search history.

(56) References Cited

U.S. PATENT DOCUMENTS

| | | | | |
|---|---|---|---|---|
| 6,148,118 A * | 11/2000 | Murakami et al. | ............ | 382/284 |
| 6,760,125 B1 * | 7/2004 | Hayama | ............ | 358/1.9 |
| 6,862,107 B1 * | 3/2005 | Kawai | ............ | 358/1.18 |
| 6,947,592 B2 * | 9/2005 | Ishikawa | ............ | 382/166 |
| 7,570,807 B2 * | 8/2009 | Hanazato | ............ | 382/162 |
| 2008/0080009 A1 * | 4/2008 | Masui et al. | ............ | 358/3.28 |
| 2008/0186325 A1 * | 8/2008 | Higgins et al. | ............ | 345/592 |

FOREIGN PATENT DOCUMENTS

| | | |
|---|---|---|
| JP | HEI5-136979 | 6/1993 |
| JP | HEI1-298717 | 10/1999 |
| JP | HEI11-298717 | 10/1999 |
| JP | 2000-293339 | 10/2000 |
| JP | 2006-093902 | 4/2006 |

* cited by examiner

*Primary Examiner* — Steven Kau (74) *Attorney, Agent, or Firm* — Scully, Scott, Murphy & Presser, PC (57) ABSTRACT

An image processing device includes an additional image formation unit configured to form an additional image having a first predetermined density. At least a part of the additional image is overlaid with a main image having a second predetermined density, the main image being formed on an image formation medium. A boundary image formation unit is configured to form a boundary image which is formed in an area defined in the vicinity of an overlaid area where the additional image is overlaid with the main image. A density of the boundary image is lower than both the first predetermined density and the second predetermined density. A synthesized image formation unit is configured to synthesize the main image, additional image and the boundary image to form a synthesized image.

9 Claims, 9 Drawing Sheets

IMAGE PROCESSING DEVICE WITH AN ADDITIONAL IMAGE OVERLAYING FUNCTION

CROSS-REFERENCE TO RELATED APPLICATION

This application claims priority under 35 U.S.C. §119 from Japanese Patent Application No. 2008-101332 filed on Apr. 9, 2008. The entire subject matter of the application is incorporated herein by reference.

BACKGROUND

1. Technical Field

Aspects of the present invention relate to an image processing device such as a printer, a copier, a personal computer configured to process an image and the like, which are implemented with a function to overlay a watermark one an original image.

2. Prior Art

Conventionally, image processing devices capable of overlaying a watermark image composed of character strings and/or color graphics, on an original image which is received from an external device have been known. For example, a graphic image of a company LOGO and/or character strings such as "DO NOT COPY", "IN HOUSE USE ONLY", "CONFIDENTIAL" may be overlaid when the original image is printed.

An example of such an image processing device is disclosed in Japanese Patent Provisional Publication No. 2000-293339 (hereinafter, referred to as '339 publication). According to '339 publication, the color and the color density of the watermark can be adjusted arbitrarily. Generally, the color density of the watermark is set to be thinner than the original image on which the watermark image is overlaid.

SUMMARY OF THE INVENTION

According to '339 publication, however, at portions where the watermark image overlaid with the original image and portions adjacent thereto, the colors and color densities of the original image and the watermark image interfere with each other, which causes the images at such boundary portions obscure or unclear.

Aspects of the present invention are advantageous in that there is provided an improved image processing device, which includes an additional image formation unit configured to form an additional image having a first predetermined density, at least a part of the additional image being overlaid with a main image having a second predetermined density, the main image being formed on an image formation medium, a boundary image formation unit configured to form a boundary image which is formed in an area defined in the vicinity of an overlaid area where the additional image is overlaid with the main image, a density of the boundary image being lower than both the first predetermined density and the second predetermined density, and a synthesized image formation unit configured to synthesize the main image, the additional image and the boundary image to form a synthesized image.

According to other aspects of the invention, there is provided an image formation device, which includes an additional image formation unit configured to form an additional image having a first predetermined density, at least a part of the additional image being overlaid with a main image having a second predetermined density, the main image being formed on an image formation medium, a boundary image formation unit configured to form a boundary image which is formed in an area defined in the vicinity of an overlaid area where the additional image is overlaid with the main image, a density of the boundary image being lower than both the first predetermined density and the second predetermined density, a synthesized image formation unit configured to synthesize the main image, the additional image and the boundary image to form a synthesized image, and an image output unit configured to form the synthesized image formed by the synthesized image formation unit onto a recoding sheet.

According to further aspects of the invention, there is provided a computer-accessible recoding medium containing a computer-executable program which includes instructions to causes a computer to execute the steps of forming an additional image having a first predetermined density, at least a part of the additional image being overlaid with a main image having a second predetermined density, the main image being formed on an image formation medium, forming a boundary image which is formed in an area defined in the vicinity of an overlaid area where the additional image is overlaid with the main image, a density of the boundary image being lower than both the first predetermined density and the second predetermined density, and synthesizing the main image, the additional image and the boundary image to form a synthesized image.

DETAILED DESCRIPTION OF THE EMBODIMENT

Hereinafter, referring to the accompanying drawings, an embodiment according to aspects of the invention will be described. In the following description, a so-called multifunctional device (MFD) having functions of a facsimile machine, a copier, a printer and a scanner will be described as an exemplary embodiment of an image processing device according to the invention.

<Appearance>

Figure 1:
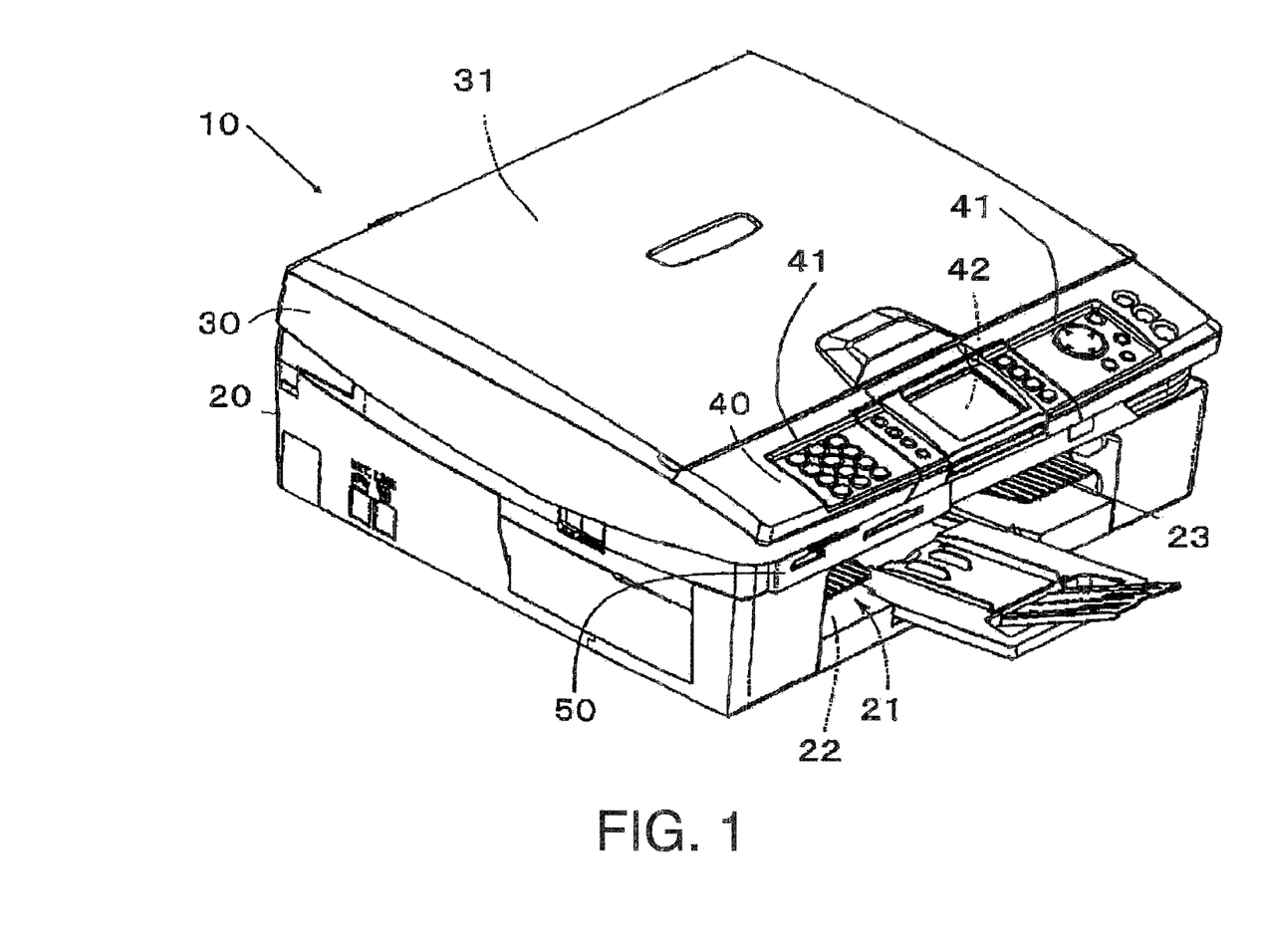
FIG. 1 is a perspective view showing an appearance of an image formation device according to aspects of the invention.

FIG. 1 is a perspective view showing an appearance of an image processing device 10 according to the embodiment of the invention. As shown in FIG. 1, the image processing device 10 includes a printer unit 20 provided at a lower portion thereof, and a scanner unit 30 provided at an upper portion thereof. Further, the image processing device 10 is provided with an operation panel 40, which is provided on an upper front portion thereof, and a slot unit 50 provided on an front portion thereof.

The printer unit 20 has an opening 21 on an front surface thereof. Inside the opening 21, a sheet feed tray 22 and sheet discharge tray 23 are accommodated in a two-tiered manner. The sheet feed tray 22 is for accommodating stacked print sheets. The print sheets stacked in the sheet feed tray 22 are fed inside the printer 20 one by one, and discharged onto the sheet discharge tray 23 after images are printed thereon.

The scanner 30 is of a so-called flat-bed type. The scanner 30 is provided with a cover plate 31 which also serves as an upper cover of the image processing device 10. Below the cover plate 31, a platen glass is provided. When an original is scanned, the cover plate 31 is opened upward, an original sheet is placed on the platen glass with a scanned face facing thereto, and the cover plate 31 is closed. When a scanning operation is ready as above, and when a user inputs a command to start scanning, an image sensor (not shown) provided below the platen glass is driven to scan the original through the platen glass. For example, if an image, which is a collection of characters, symbols, marks, numbers and the like, is formed on the original, such an image is scanned by the scanner 30.

The operation panel 40 includes a keyboard unit 41 and a display unit 42 provided with a display device such as an LCD (Liquid Crystal Display). The keyboard unit 41 is provided with various operational buttons such as alphanumerical buttons, a start button, functional operation buttons, etc. The display unit 42 is configured to display function selection screen that allows a user to designate a function the user intended to use. The display unit 42 is also capable of displaying operational procedures, status of executed jobs, and information corresponding to the user's operation of the keyboard unit 41.

The user is capable of setting various function settings and executing various functions by operating the operation panel 40. For example, the user can select the facsimile function, printer function, scanner function or copier function and/or set the size and type (normal sheet or postcard sheet) of the print sheet, one-side print mode or both-side print mode and the like, through the operation panel 40.

According to the embodiment, the image formation device 10 has a watermark function as one of copier functions. The watermark function is a function to synthesize an image which is stored in a compact memory card (described later), an image obtained by scanning an original with the scanner unit 30, a predetermined image which is frequently used and stored in an EEPROM (Electronically Erasable Programmable ROM) 84 in advance with a main image which is obtained by scanning an original, and print the synthesized image on a print sheet. An instruction to execute the watermark function is also input through the operation panel 40.

The slot unit 50 is configured such that various compact memory cards can be inserted. For example, if a compact memory card is inserted in the slot unit 50 and the user executes a certain operation through the operation panel 40, the image data stored in the compact memory card is retrieved, and the thus retrieved image data is displayed on the display unit 42 or printed on the print sheet.

<Electrical Configuration>

Next, referring to FIG. 2, an electrical configuration of the image formation device 10 will be described.

Figure 2:
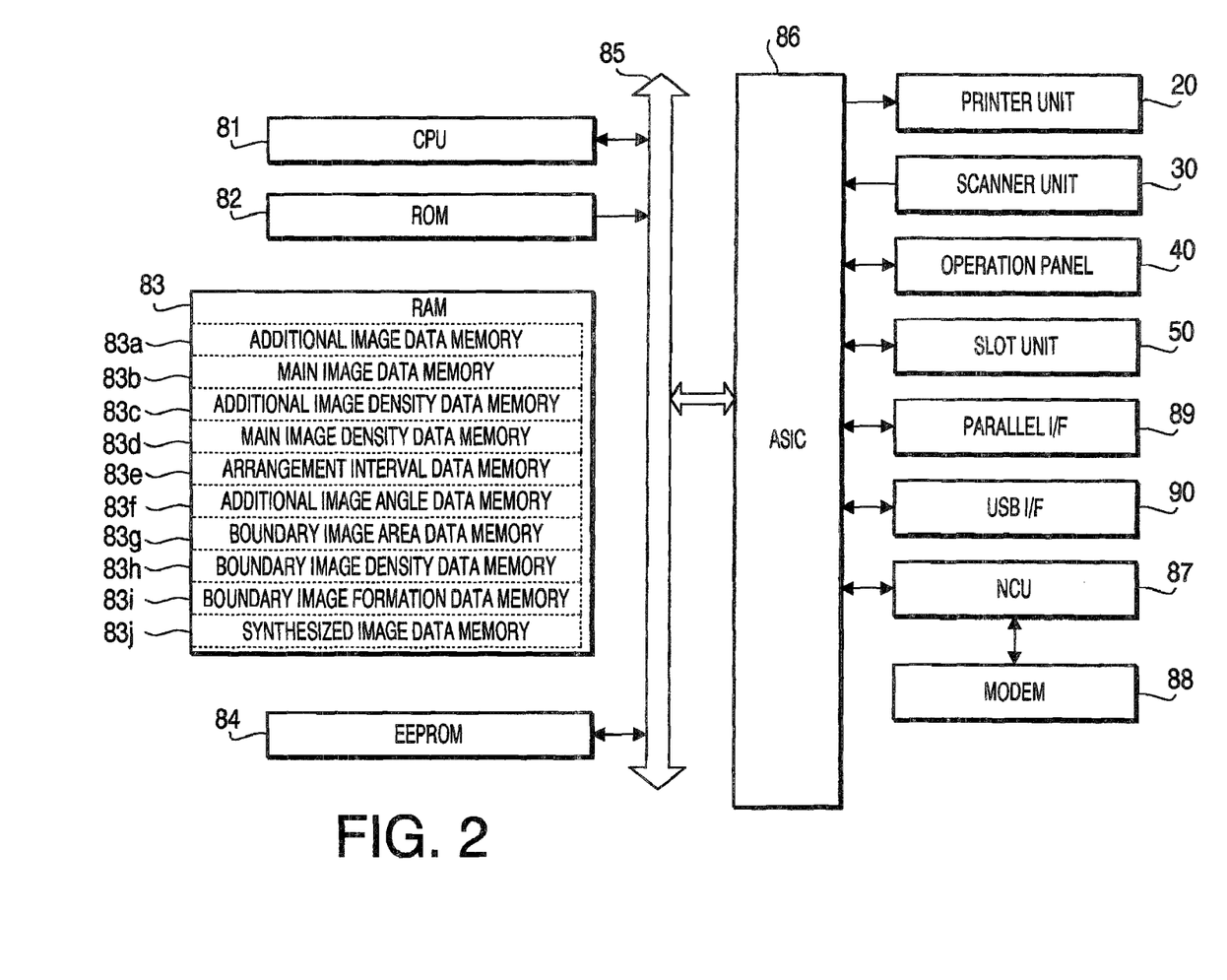
FIG. 2 is a block diagram showing an electronic configuration of the image formation device according to aspects of the invention.

FIG. 2 is a block diagram illustrating the electrical configuration of the image formation device 10. The image formation device 10 includes a micro-computer which is provided with a CPU 81, a ROM 82, a RAM 83 and the EEPROM 84. The CPU 81 is connected to ASIC 86 via a bus 85. The CPU 81 controls various functions the image formation device 10 is capable of executing and/or various units connected to the ASIC (Application Specific Integrated Circuit) 86 in accordance with various signals transmitted/received via the NCU 87.

Figure 3:
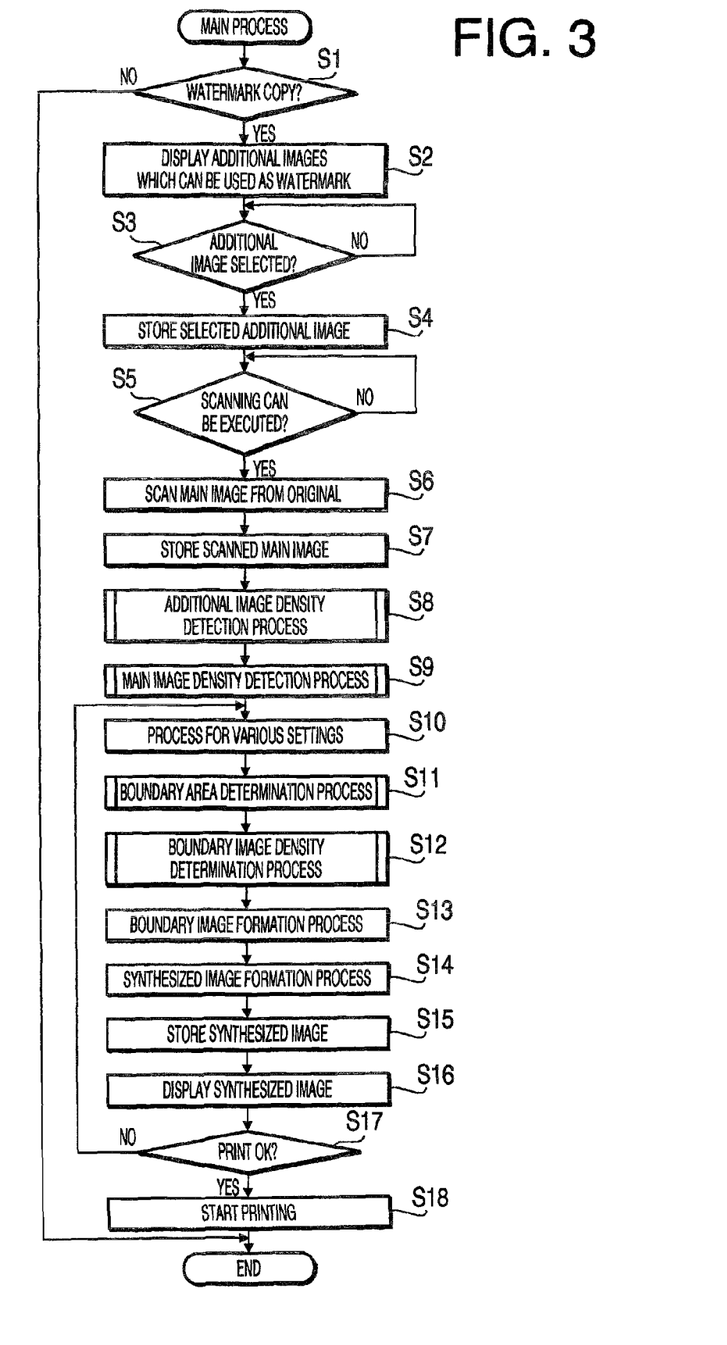
FIG. 3 is a flowchart illustrating a main process of the image formation device according to aspects of the invention.
Figure 4:
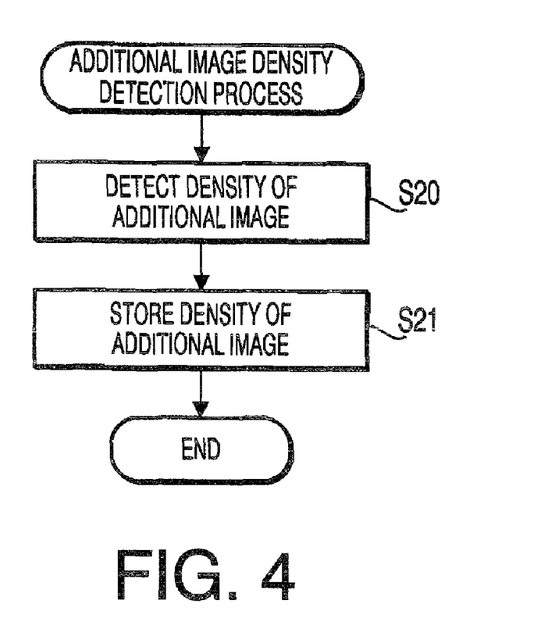
FIG. 4 is a flowchart illustrating an additional image density detection process according to aspects of the invention.
Figure 5:
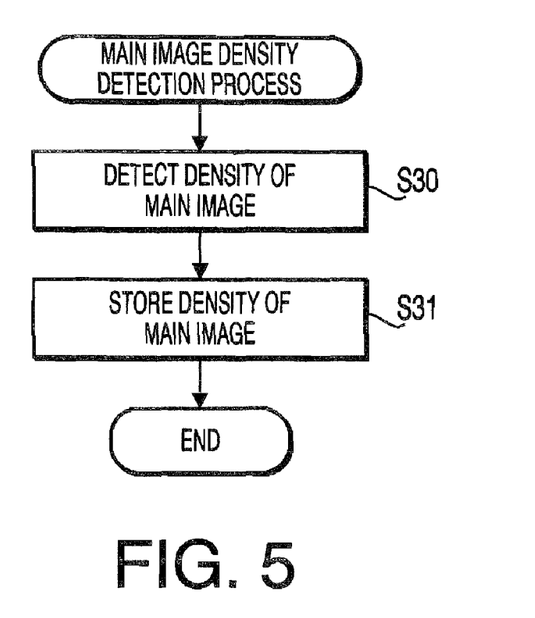
FIG. 5 is a flowchart illustrating a main image density detection process according to aspects of the invention.
Figure 6:
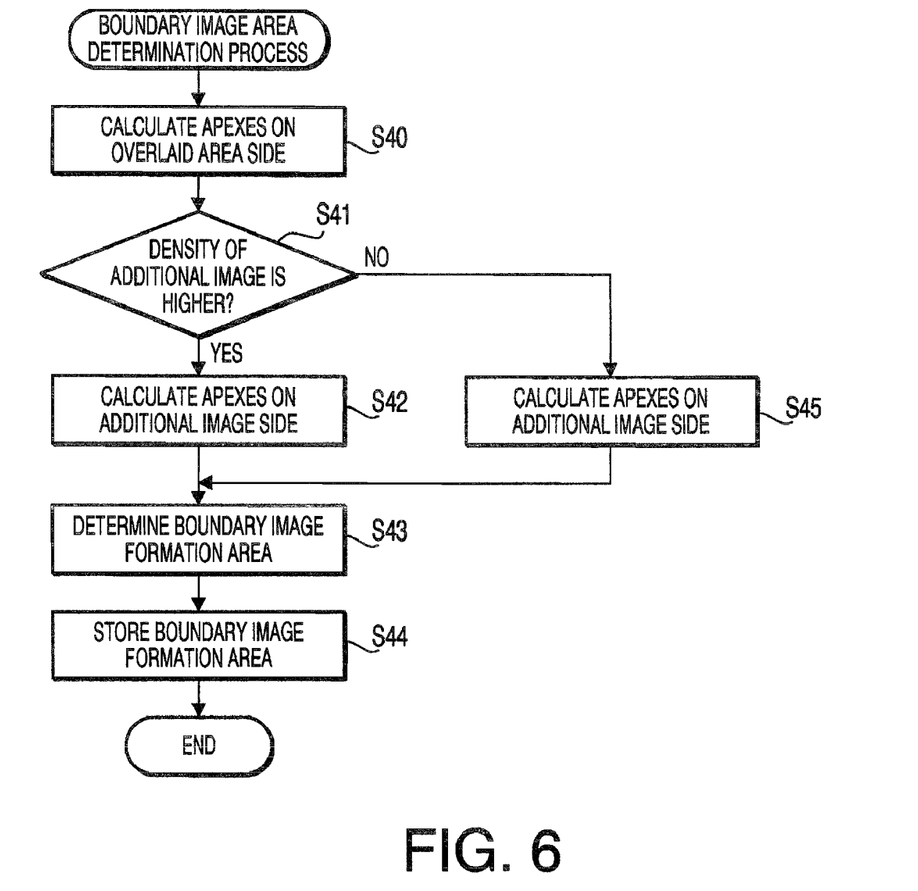
FIG. 6 is a flowchart illustrating a boundary image area determination process according to aspects of the invention.

The ROM 82 stores programs and data for controlling various operations of the image formation device 10. For example, the CPU 81 executes the programs stored in the ROM 82 to execute various processes such as:

a main process in which, as shown in FIG. 3, an additional image is synthesized with the main image and print the thus synthesized image on the print sheet;

an additional image density detection process shown in FIG. 4 for detecting the density of the additional image;

a main image density detection process shown in FIG. 5 for detecting the density of the main image;

a boundary image formation area determination process shown in FIG. 6 for determining an area in which a boundary image is formed; and a boundary image density determination process for determining the density of the boundary image.

The RAM 83 is used as a storage area for temporarily storing various pieces of data used when the CPU 81 executes various programs and as a work area when the CPU 81 executes the programs. The RAM 83 has a plurality of storage areas which include an additional image data memory 83a, a main image data memory 83b, an additional image density data memory 83c, a main image density data memory 83d, an arrangement interval data memory 83e, an additional image angle data memory 83f, a boundary image area data memory 83g, a boundary image density data memory 83h, a boundary image generation data memory 83i, a synthesized image data memory 83j.

The additional image data memory 83a is an area for temporarily storing data representing an additional image to be printed on the print sheet as a watermark when the watermark function provided as a part of the copier function. The main image data memory 83b is an area for temporarily storing data representing a main image which is synthesized with the additional image (i.e., the watermark image) and printed on the print sheet. The additional image density data memory 83c is an area for temporarily storing the density of the additional image.

The main image density data memory 83d is an area for temporarily storing the density of the main image. The arrangement interval data memory 83e is an area for temporarily storing the arrangement intervals among the additional images. The additional image angle data memory 83f is an area for temporarily storing a set angle of the additional image.

The boundary image area data memory 83g is an area for temporarily storing a position of an area in which the boundary image is formed. The boundary image density data memory 83h is an area for temporarily storing the density of the boundary image. The boundary image formation data memory 83i is an area for temporarily storing a boundary image which is formed based on a size corresponding to an area in which the boundary image stored in the boundary image area data memory 83g and a density of the boundary image stored in the boundary image density data memory 83h. The synthesized data memory 83j is an area for temporarily storing data of the synthesized image to be printed on the print sheet using the watermark function.

The EEPROM 84 stores various settings, flags and the like which should be retained after the power is off. For example, the EEPROM 84 stores the additional image retrieved through the slot unit 50. By storing the additional image in the EEPROM 84, it can be used repeatedly without retrieving through the slot unit 50 repeatedly. Further, as mentioned above, predetermined additional images which are frequently user are stored in the EEPROM 84.

The ASIC 86 is for controlling peripherals such as the printer unit 20 connected thereto in accordance with instructions issued by the CPU 81.

The printer unit 20 forms an image on the print sheet in response to a print instruction signal issued by the ASIC 86. The scanner unit 30 scans images and/or characters on the original, in response to the scan instruction signal issued by the ASIC 86, and outputs image data representing the scanned images/characters to the ASIC 86. The operation panel 40 detects the operating status of the keyboard 41 of the operation panel 40 in response to a detection instruction signal received from the ASIC 86 and the detected operating status to the ASIC 86. The operation panel 40 further functions to supply image display data to the display unit 42 in response to an instruction signal received from the ASIC 86. The slot unit 50 retrieves image data stored in the compact memory card in response to a retrieval instruction signal received from the ASIC 86, and transmits the retrieved image data to the ASIC 86.

The ASIC 86 is connected to the NCU (Network Control Unit) 87. The NCU 87 is configured to receive a communication signal from a public telephone line network. The modem 88 is configured to demodulate the received communication signal and transmits the decoded communication signal to the ASIC 86, When the ASIC 86 transmits image data to an external device via facsimile, the modem 88 modulates the image data to the communication signal and transmits the modulated communication signal to the public telephone line network via the NCU 87.

The parallel interface 89 executes data transmission/reception with an external device such as a personal computer via a parallel cable under control of communication control signal issued by the ASIC 86. The USB interface 90 executes data transmission/reception to/from an external device such as a personal computer via a USB cable under control of communication control signal issued by the ASIC 86.

<Operation>

Figure 8:
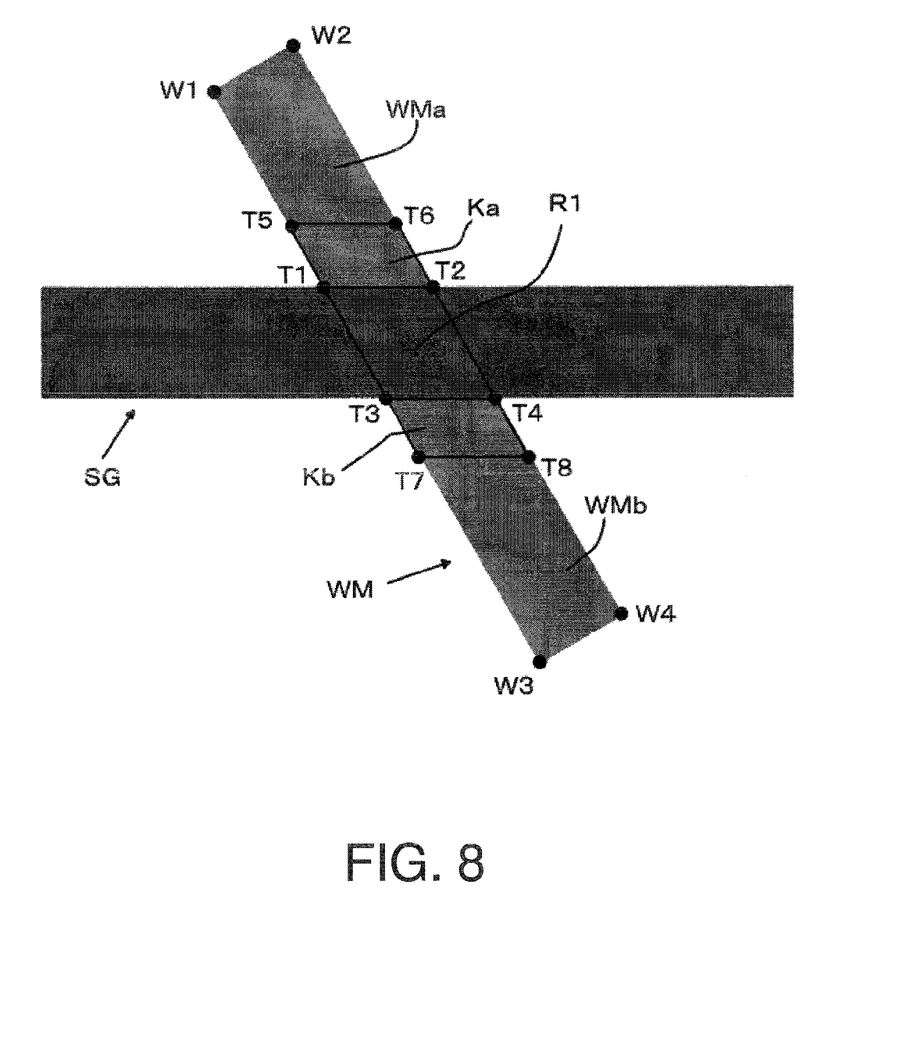
FIG. 8 schematically shows a synthetic image which is formed by synthesizing the main image data and the additional image data.
Figure 9:
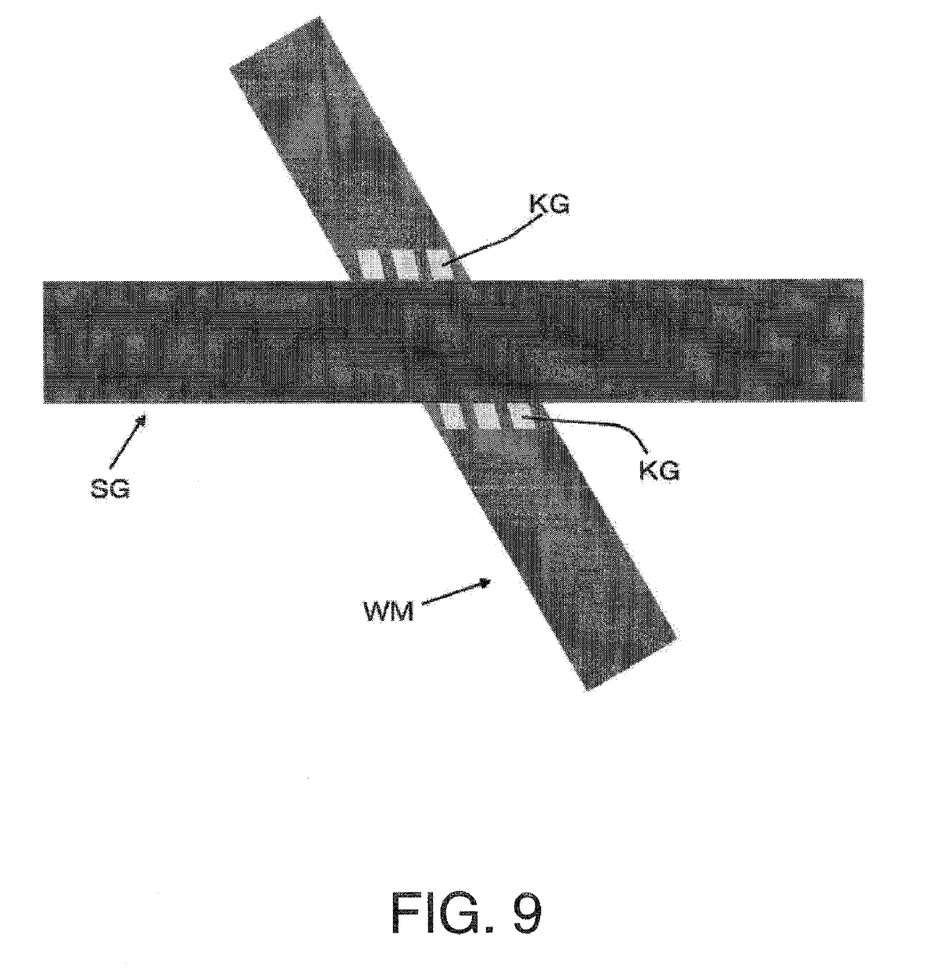
FIG. 9 schematically shows a synthetic image which is formed by synthesizing the main image data, additional image data and discontinuous boundary image data.
Figure 10:
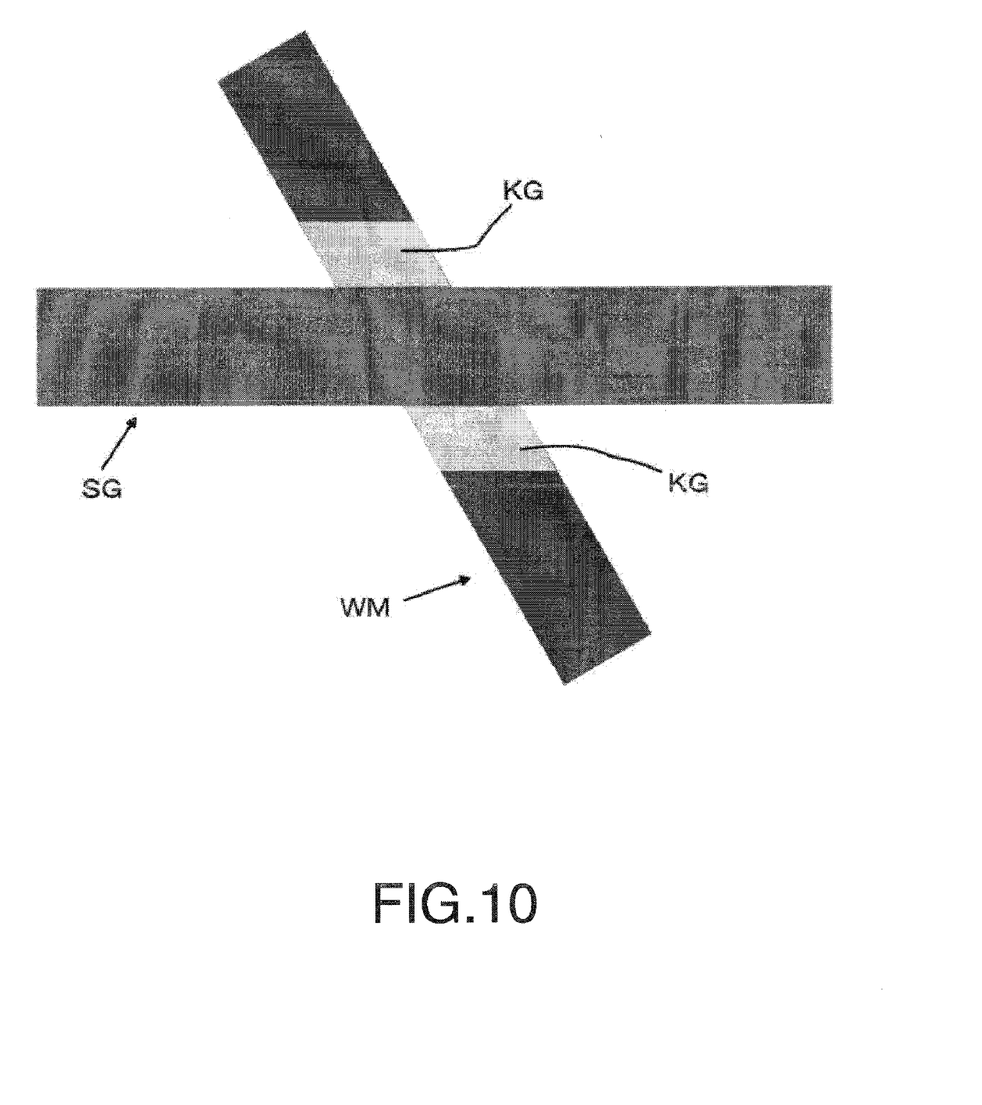
FIG. 10 schematically shows a synthetic image which is formed by synthesizing the main image data, additional image data and continuous boundary image data.

Hereinafter, referring to FIGS. 3-10, an operation of the image formation device 10 will be described. In particular, FIG. 8 schematically shows a synthesized image represented by synthesized image data stored in the synthesized image data memory 83*j* of the RAM 83. The synthesized image data is generated by synthesizing the main image data and the additional image data. FIG. 9 also shows the synthesized image represented by the synthesized image data stored in the synthesized image data memory 83*j*. In a case of FIG. 9, the density of the additional image is lower than the density of the main image, and the main image data and boundary image data which is discontinuous with the additional image data are synthesized. FIG. 10 also schematically shows a synthesized image represented by the synthesized image data stored in the synthesized image data memory 83*j*. In the case of FIG. 10, the density of the additional image is higher than the density of the main image, and the main image data and the boundary image data which is continuous with the additional image data are synthesized.

Main Process

Firstly, referring to FIG. 3, a main process of a watermark copying operation executed by the CPU 81 of the image formation device 10 will be described. FIG. 3 shows a flowchart illustrating the main process of the image formation device 10. The main process is initiated when the user operates the operation panel 40 and selects the copier function from among the various functions (e.g., the facsimile functions, printer function, scanner function and copier function). The main process includes a process for preventing the visibility of the watermark from being lowered by forming a boundary image of which the density is relatively low within an area adjacent to the area where the watermark is overlaid with the main image.

When the main process is started, the control judges whether a "watermark copy" function has been selected (S1). According to the present embodiment, when the user selects the copier function of the image formation device 10, an inquiry requiring the user to select a type of copy (e.g., the watermark copy, a normal copy, a both-side copy or the like) is displayed on the display unit 42. If the "watermark copy" is not selected (S1: NO), the main process is immediately terminated. After termination of the main process, the image formation device 10 operates another function (e.g., the facsimile function) in a manner well-known in the art until the copier function is selected.

If the "watermark copy" is selected (S1: YES), candidate additional images that can be used as the watermark are displayed on the display unit 42 (S2). It should be noted that the candidate additional images as displayed include ones stored in the compact memory card, ones scanned with the scanner unit 30, ones stored in the EEPROM 84, and the like.

The process stays in a standby state until the user selects one of the candidate watermark images displayed on the display unit 42 (S3: NO). When an additional image is selected (S3: YES), the image data representing the selected additional image in the additional image data memory 83*a* (S4).

Next, the CPU 81 judges whether the user inputs "SCAN OK" instruction through the keyboard 41 (S5). The CPU 81 stays in the standby state until the "SCAN OK" instruction is inputted (S5: NO), and when the "SCAN OK" instruction is inputted (S5: :YES), the CPU 81 controls the scanner unit 30 to operate and the main image formed on the original of the main image placed on the platen glass is scanned (S6). Then, the data representing the scanned main image is stored in the main image data memory 83*b* (S7).

Next, the additional image density detection process, which is shown in FIG. 4, for detecting the density of the additional image is executed (S8). The additional image density detection process will be described in detail later.

Thereafter, the main image density detection process, which is shown in FIG. 5, for detecting the density of the main image is executed (S9). The main image density detection process will be described in detail later.

In S10, various settings are applied to the additional image. The synthesized image is formed by synthesizing the additional image obtained in S4 with the main image obtained in S7, and further with the boundary image which will be described later. Specifically, in this setting process, an arrangement interval and angle of the additional image with respect to the main image are set. For example, the position of the additional image with respect to the main image is determined such that arrangement intervals among a plurality of additional images adjacent to each other become constant. The arrangement interval is set by operation of the keyboard 41, and is stored in the arrangement interval data memory

83e. Further, a screen indicating that the angle of the additional image can be designated is displayed on the display unit 42. The user then operates the keyboard 41 to set the angle of the additional image. The thus set angle of the additional image is stored in the additional image angle data memory 83f.

Next, the boundary image area determination process is executed (S11). The boundary image area determination process is for determining a area in which the boundary image, which is formed in a area adjacent to an overlaid area where the additional image is overlaid with the main image. The boundary image area determination process will be described in detail later.

Figure 7:
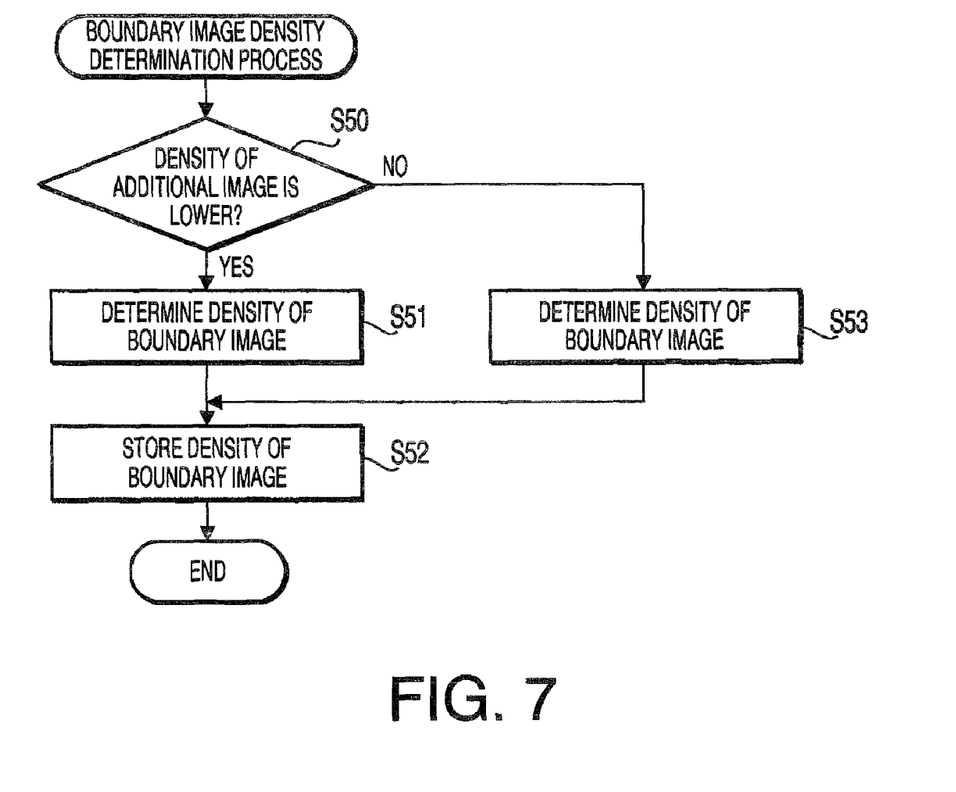
FIG. 7 is a flowchart illustrating a boundary image density determination process according to aspects of the invention.

Then, the boundary image density determination process shown in FIG. 7 is executed (S12). The boundary image density determination process is for determining the density of the boundary image, which process will be described later.

After the image formation area of the boundary image is determined in S11, the boundary image formation process is executed in S13 based on the size corresponding to the size of the boundary image formation area, the density determined in S12, the result of judgment in S12 (i.e., whether the density of the additional image stored in the boundary image density data memory 83h is higher than the density of the main image). If the density of the additional image is equal to or lower than the density of the main image, as shown in FIG. 9, the boundary image KG is formed such that the boundary image is discontinuous in the direction where main image SG transverses the additional image WM. If the density of the additional image is higher than the density of the main image, as shown in FIG. 10, the boundary image KG is formed such that the boundary image is continuous in a direction where the main image SG traverses the additional image WM. The thus generated data representing the boundary image is stored in the boundary image formation data memory 83i.

As above, based on the settings made in S10-S13, the synthesized image to be printed on the print sheet is generated (S14). Then the data representing the synthesized image is stored in the synthesized image data memory 83j. (S15).

In S16, the synthesized image represented by the synthesized image data stored in the synthesized image data memory 83j is displayed on the display unit 42. At this stage, the user can input "PRINT OK" instruction if the user wishes to print the displayed image. Thus, in S17, the CPU 31 judges whether the keyboard unit 41 is operated and the "PRINT OK" instruction is inputted. If the "PRINT OK" instruction is not inputted within a predetermined waiting period (S17: NO), the CPU 31 repeats the processes from S10 If the "PRINT OK" instruction is inputted (S17: YES), the CPU 31 starts printing (S18) and then terminates the main process.

Additional Image Density Detection Process

FIG. 4 shows a flowchart illustrating an additional image density detection process which is called in S8 of the main process.

In the additional image density detection process, firstly, the CPU 81 detects the average density of the entire additional image represented by the additional image data stored in the additional image data memory 83a (S20). Next, the detected density is stored in the additional image density data memory 83c (S21).

Main Image Density Detection Process

FIG. 5 shows a flowchart illustrating a main image density detecting process which is executed in S9 of the main process.

In the main image density detection process, firstly, the CPU 81 detects the average density of the entire main image represented by the data stored in the main image data memory 83b (S30). Then, the CPU 31 stores the detected density in the main image density data memory 83d (S31).

Boundary Image Area Determination Process

FIG. 6 shows a flowchart illustrating the boundary image area determination process, which is called in S12 of the main process shown in FIG. 4.

When the boundary image area determination process is started, the CPU 81 calculates apexes of the overlaid area within the boundary image area based on the overlaid area where the additional image is overlaid with the main image (S40). For example, in FIG. 8, the apexes of the overlaid area R1 where the additional image WM is overlaid with the main image SG are T1, T2, T3 and T4. When partial areas of the additional image WM excluding the overlaid area R1 are represented by WMa and WMb as shown in FIG. 8, the apexes of the partial area WMa are W1, W2, T1 and T2, while the apexes of the other partial area WMb are W3, W4, T3 and T4. Since the boundary image is formed on the additional image, the overlaid area side apexes of a boundary image area Ka on the partial area WMa are T1 and T2, while the overlaid area side apexes of a boundary image area Kb on the partial area WMb are T3 and T4.

In order to calculate the additional image side apexes of the boundary image area, the CPU 81 judges whether the density of the additional image is higher than the density of the main image (S41). If the density of the additional image is higher than that of the main image (S41: YES), the CPU 31 calculates the additional image side apexes of the boundary image area (S42) based on a predetermined ratio X which is stored in the ROM 82 as the ratio when the density of the additional image is judged to be higher. For example, the apex T5 on a line W1-T1, which is the additional image side apex of the boundary image area Ka, is calculated by multiplying the length of the line W1-T1 by the ratio X. The apex T6, which is on the line W2-T2 and the additional image side apex of the boundary image area Ka is calculated by multiplying the length of the line W2-T2 by the ratio X. The additional image side apex T7 on the line W3-T3 of the boundary image area Kb is calculated by multiplying the length of the line W3-T3 by the predetermined ratio X. The additional image side apex T8 on the line W4-T4 of the boundary image area Kb is calculated by multiplying the length of the line W4-T4 by the predetermined ratio X.

As above, the apexes of the area where the boundary image Ka is formed are T1, T2, T5 and T6 (S43). With the similar calculation, the apexes of the area where the boundary image Kb is formed are obtained to be T3, T4, T7 and T8.

The thus calculated areas are stored in the boundary image area data memory 83g (S44). As above, the formation areas of the boundary image are determined, and the boundary image area determination process is terminated.

If the CPU 81 judges that the density of the additional image is equal to or lower than that of the main image (S41: NO), the CPU 81 calculates the additional image side apexes of the boundary image area based on a predetermined ratio Y which is stored in the ROM 82 as the ratio when the density of the additional image is judged to be lower (S45). For example, the apex T5 on a line W1-T1, which is the additional image side apex of the boundary image area Ka, is calculated by multiplying the length of the line W1-T1 by the ratio Y. The apex T6, which is on the line W1-T1 and the additional image side apex of the boundary image area Ka is calculated by multiplying the length of the line W2-T2 by the ratio Y. The additional image side apex T7 on the line W3-T3 of the boundary image area Kb is calculated by multiplying the length of the line W3-T3 by the predetermined ratio Y. The additional image side apex T8 on the line W4-T4 of the boundary image area Kb is calculated by multiplying the length of the line W4-T4 by the predetermined ratio Y. Then, the CPU 81 executes the process from S43 as described above.

According to the present embodiment, the predetermined ratio Y is smaller than the predetermined ratio X, which is the ratio when the density of the additional image is judged to be higher than the density of the main image (S41: YES). Therefore, the boundary image area when the density of the additional image is higher than that of the main image is larger than the boundary area when the density of the additional image is equal to or lower than that of the main image. Therefore, if the density of the additional image is higher than that of the main image, the boundary areas between the overlaid portion where additional image is overlaid with the main image is formed to be relatively large and clarified. If the density of the additional image is equal to or lower than that of the main image, the additional image is changed only in small areas at the boundaries between the overlaid portion where the additional image is overlaid with the main image. Therefore, in this case, the appearance of the additional image is substantially retained, and thus an improved appearance of the additional image can be achieved.

Boundary Image Density Determination Process

FIG. 7 shows a flowchart illustrating the boundary image formation process which is called in S13 of the main process.

In the boundary image density determination process, firstly, the CPU 31 judges whether the density of the additional image stored in the additional image density data memory 83*c* is lower than the density of the main image which is stored in the main image density data memory 83*d* (S50).

If the CPU 81 determines that the density of the additional image is lower than that of the main image (S50: YES), the CPU 81 determines the density of the boundary image to be within a predetermined density range which is lower than the density of the additional image (S51). Then, the CPU 81 stores the thus determined density of the boundary image and the judgment result at S50 in the boundary image density data memory 83*h* (S52), and terminates the boundary image density determination process.

If the CPU 81 determines that the density of the additional image is equal to or higher than that of the main image (S50: NO), the CPU 81 determines the density of the boundary image to be in a predetermined density range which is lower than the density of the main image (S53). Then, the CPU 81 stores the thus determined density of the boundary image and the judgment result at S50 in the boundary image density data memory 83*h* (S52), and terminates the boundary image density determination process.

It should be noted the person ordinary skilled in the art easily appreciates that the invention should not be limited to the above-described exemplary embodiment, but can be modified in a various ways without departing the scope of the invention.

The term "synthesize" used in the above-described embodiment means not only the act of synthesis of the main image, additional image and boundary image, but also includes the act of synthesis of the main image and the additional image to which a correction corresponding to the boundary image has been applied.

In the above-described exemplary embodiment, the image formation device 10 implemented with programs for the main process is described. Such a configuration could easily be modified such that a personal computer implemented with the programs of the main process and the synthesized image is formed in the personal computer using the additional image and the main image.

According to the above-described embodiment, the boundary image is formed in a direction where the main image transverses the additional image. However, the invention needs not be limited to such a configuration and the boundary image may be formed in the direction where the additional image transverses the main image.

According to the above-described embodiment, for calculating the additional image side apexes of the boundary image area, the length of the additional image is multiplied with a predetermined ratio. The invention needs not be limited to such a configuration. For example, the apexes may be calculated by multiplying a vertical length of the main image (i.e., the length of the main image in a direction which is perpendicular to a direction in which the main image extends) by a predetermined ratio.

According to the above-described embodiment, as the density of the boundary image, a density which is lower than any of the density of the additional image and the density of the main image is employed. However, the invention needs not be limited to such a configuration. For example, the density of the boundary image may be determined to be the lowest density within a density range which can be used to form an image, regardless of the density of the additional image or the main image. Generally, the lowest density is the density when no image is formed. Therefore, in such a case, the boundary image has no color.

According to the above-described embodiment, a higher priority is given to the visibility of the main image than that of the additional image. For this reason, when the density of the additional image is higher than that of the additional image, the boundary area is enlarged, while the boundary area is reduced when the density of the additional image is lower than that of the main image. However, the invention needs not be limited to such a configuration. For example, if the higher priority is given to the visibility of the additional image than the visibility of the main image, when the density of the additional image is higher than that of the main image, the visibility of the additional image will not be affected even if the boundary area is reduced since the visibility of the additional image is maintained well. However, if the density of the additional image is lower than that of the main image, the boundary area may be enlarged so that the visibility of the additional image will not be affected.

According to the embodiment, when the density of the additional image, an averaged density of the entire image is calculated. However, the invention needs not be limited to such a configuration. For example, the average density of the additional image and the main image within the overlaid area where the additional image is overlaid with the main image.

What is claimed is:

1. An image processing device, comprising:
   a processor configured to control the operation of the device to form operating units, the operating units comprising:
   an additional image retrieval unit configured to retrieve an additional image having a first predetermined density, at least a part of the additional image being overlaid with a main image having a second predetermined density, the main image being formed on an image formation medium;
   a boundary image formation unit configured to form a boundary image which is formed in an area defined in the vicinity of an overlaid area where the additional image is overlaid with the main image, a density of the boundary image being lower than both the first predetermined density and the second predetermined density, the boundary image formation unit including a main image density detection unit configured to detect the second predetermined density, an additional image density detection unit configured to detect the first predetermined density, and a density judgment unit configured to judge whether the first predetermined density is higher than the second predetermined density;

an area identifying unit configured to identify an area occupied by the additional image to include:
  a) an overlaid area where the additional image is overlaid on the main image,
  b) a boundary image area adjacent to the overlaid area, and
  c) an additional image area which is defined as an area which is occupied by the additional image with the overlaid area and the boundary image area being excluded therefrom; and a synthesized image formation unit configured to synthesize the main image, the additional image within the additional image area and the boundary image to form a synthesized image;

wherein the boundary image formation unit forms the boundary image such that the boundary image is discontinuous in the direction where the main image transverses the additional image if the density judgment unit judges that the first predetermined density is higher than the second predetermined density, while the boundary image formation unit forms the boundary image such that the boundary image is continuous in the direction where the main image transverses the additional image if the density judgment unit judges that the first predetermined density is lower than the second predetermined density.

2. The image processing device according to claim 1, wherein the synthesized image formation unit operates such that the boundary image is located within an area where the additional image is formed.

3. The image processing device according to claim 1, wherein the boundary image formation unit forms the boundary image such that the boundary image is continuous in a direction where the main image transverses the additional image.

4. The image processing device according to claim 1, wherein the boundary image formation unit forms the boundary image such that the boundary image is discontinuous in the direction where the main image transverses the additional image.

5. The image processing device according to claim 1, wherein the boundary image formation unit includes:
a main image density detection unit configured to detect the second predetermined density;
an additional image density detection unit configured to detect the first predetermined density; and
a density judgment unit configured to judge whether the first predetermined density is higher than the second predetermined density, and
a boundary image area determination unit configured to determine a size of a boundary image area in which the boundary image is formed in accordance with a judgment result of the density judgment unit.

6. The image processing device according to claim 5, wherein the boundary image area determination unit defines a first boundary image area when the first predetermined density is judged to be higher than the second predetermined density, and defines a second boundary image area when the first predetermined density is judged to be lower than the second predetermined density, wherein the size of the first boundary image area is greater than the size of the second boundary image area.

7. The image processing device according to claim 1, wherein the boundary image formation unit forms the boundary image such that the boundary image is formed with the lowest density within a predetermined density range defined to form an image.

8. An image formation device, comprising:
a processor configured to control the operation of the device to form operating units, the operating units comprising:
  an additional image retrieval unit configured to retrieve an additional image having a first predetermined density, at least a part of the additional image being overlaid with a main image having a second predetermined density, the main image being formed on an image formation medium;
  a boundary image formation unit configured to form a boundary image which is formed in an area defined in the vicinity of an overlaid area where the additional image is overlaid with the main image, a density of the boundary image being lower than both the first predetermined density and the second predetermined density, the boundary image formation unit including a main image density detection unit configured to detect the second predetermined density, an additional image density detection unit configured to detect the first predetermined density, and a density judgement unit configured to judge whether the first predetermined density is higher than the second predetermined density;
  an area identifying unit configured to identify an area occupied by the additional image to include:
    a) an overlaid area where the additional image is overlaid on the main image,
    b) a boundary image area adjacent to the overlaid area, and
    c) an additional image area which is defined as an area which is occupied by the additional image with the overlaid area and the boundary image area being excluded therefrom;
  a synthesized image formation unit configured to synthesize the main image, the additional image within the additional image area and the boundary image to form a synthesized image; and
  an image output unit configured to form the synthesized image formed by the synthesized image formation unit onto a recoding sheet;
  wherein the boundary image formation unit forms the boundary image such that the boundary image is discontinuous in the direction where the main image transverses the additional image if the density judgment unit judges that the first predetermined density is higher than the second predetermined density, while the boundary image formation unit forms the boundary image such that the boundary image is continuous in the direction where the main image transverses the additional image if the density judgment unit judges that the first predetermined density is lower than the second predetermined density.

9. A non-transitory computer readable storage medium containing a computer-executable program which includes instructions to causes a computer to execute the steps of:

retrieving an additional image having a first predetermined density, at least a part of the additional image being overlaid with a main image having a second predetermined density, the main image being formed on an image formation medium;

forming a boundary image which is formed in an area defined in the vicinity of an overlaid area where the additional image is overlaid with the main image, a density of the boundary image being lower than both the first predetermined density and the second predetermined density, the boundary image forming step further includes detecting the second predetermined density, detecting the first predetermined density and judging whether the first predetermined density is higher than the second predetermined density;

identifying an area occupied by the additional image to include:
  a) an overlaid area where the additional image is overlaid on the main image,
  b) a boundary image area adjacent to the overlaid area, and
  c) an additional image area which is defined as an area which is occupied by the additional image with the overlaid area and the boundary image area being excluded therefrom; and synthesizing the main image, the additional image within the additional image area and the boundary image to form a synthesized image;

wherein the boundary image is formed such that the boundary image is discontinuous in the direction where the main image transverses the additional image if the density judgment unit judges that the first predetermined density is higher than the second predetermined density, while the boundary image formation unit forms the boundary image such that the boundary image is continuous in the direction where the main image transverses the additional image if the density judgment unit judges that the first predetermined density is lower than the second predetermined density.

* * * * *